US011272322B1

(12) United States Patent
Gonti (10) Patent No.: US 11,272,322 B1
(45) Date of Patent: Mar. 8, 2022

(54) EYE WEAR TRACKING DEVICE AND SYSTEM AND METHOD FOR TRACKING AND LOCATING MISSING EYE WEAR

(71) Applicant: Jessica Karen Gonti, Irving, TX (US)

(72) Inventor: Jessica Karen Gonti, Irving, TX (US)

( * ) Notice: Subject to any disclaimer, the term of this patent is extended or adjusted under 35 U.S.C. 154(b) by 0 days.

(21) Appl. No.: 16/935,508

(22) Filed: Jul. 22, 2020

Related U.S. Application Data (60) Provisional application No. 62/876,888, filed on Jul. 22, 2019.

(51) Int. Cl.
*H04W 4/029* (2018.01)
*G02C 11/00* (2006.01)

(52) U.S. Cl.
CPC ............ *H04W 4/029* (2018.02); *G02C 11/10* (2013.01)

(58) Field of Classification Search
CPC ........ H04W 4/029; G02C 11/10; G06F 3/011; G06F 3/013
See application file for complete search history.

(56) References Cited

U.S. PATENT DOCUMENTS

| 6,297,737 | B1* | 10/2001 | Irvin | G08B 21/0227 340/3.51 |
|---|---|---|---|---|
| 2003/0034887 | A1* | 2/2003 | Crabtree | G01S 13/84 340/539.1 |
| 2011/0210847 | A1* | 9/2011 | Howard | G08B 21/0294 340/539.32 |
| 2014/0052486 | A1* | 2/2014 | Healy | G06Q 30/0207 705/7.13 |
| 2017/0180934 | A1* | 6/2017 | Brice | G08B 21/0294 |
| 2019/0037352 | A1* | 1/2019 | Brice | H04W 4/023 |
| 2019/0208363 | A1* | 7/2019 | Shapiro | G16H 50/30 |

* cited by examiner

*Primary Examiner* — Orlando Bousono
(74) *Attorney, Agent, or Firm* — Plager Schack LLP (57) ABSTRACT

An eye wear tracking system is disclosed that allows a user to register a pair of glasses whose location is tracked and which, if misplaced or lost, can be found. The eye wear tracking system includes a micro mini tracker device that includes a unique identifier (UID) tag code with a UID tag code value that uniquely identifies a specific pair of glasses of a user, an adhesive backing that is applied to a backside of the micro mini tracker device to adhere the micro mini tracker device to a frame element of the specific pair of glasses of the user, and an eye wear tracking mobile app that runs on a mobile device of the user. The eye wear tracking mobile app allows the user to provide the UID tag code value to track location of the specific pair of glasses of the user. The eye wear tracking system results in both saved time and money.

8 Claims, 5 Drawing Sheets

EYE WEAR TRACKING DEVICE AND SYSTEM AND METHOD FOR TRACKING AND LOCATING MISSING EYE WEAR

CLAIM OF BENEFIT TO PRIOR APPLICATION

This application claims benefit to U.S. Provisional Patent Application 62/876,888, entitled "Tracker device on eyewear which includes a software application called 'Reveal My Glasses'," filed Jul. 22, 2019. The U.S. Provisional Patent Application 62/876,888 is incorporated herein by reference.

BACKGROUND

People with glasses and other eye wear often misplace or lose their glasses/eye wear. This tends to be a big headache for many such people who have glasses/eye wear because of the troubles involved in finding misplaced glasses or other eye wear items.

Adding to these troubles, glasses and eye wear can be costly for anyone, However, for those who tends to misplace or lose their glasses or eye wear, and especially for those who suffer from medical conditions such as memory loss or those who are just forgetful, misplacing or losing their glasses or eye wear items can be a real drain on their finances.

Therefore, what is needed is a way to help find missing eye wear so that people do not go without their eye wear or resort to buying new replacement eye wear.

BRIEF DESCRIPTION

A novel eye wear tracking device and system and a novel method for tracking and locating missing eye wear are disclosed which allow a user to register a pair of glasses whose location is tracked and which, if misplaced or lost, can be found.

DETAILED DESCRIPTION

Some embodiments of the invention include a novel eye wear tracking device and system and a novel method for tracking and locating missing eye wear which allow a user to register a pair of glasses whose location is tracked and which, if misplaced or lost, can be found, thereby saving the user both time and money. The glasses may be any kind of eye wear, such as reading glasses, seeing eye glasses, driving glasses, sunglasses, fashion eye wear, safety goggles, sports glasses/goggles with protective or corrective lenses or shading, etc.

In some embodiments, the eye wear tracking device and system allows a user to register a pair of glasses whose location is tracked and which, if misplaced or lost, can be found. In some embodiments, the eye wear tracking device system includes a micro mini tracker device that includes (i) a UID tag code with a UID tag code value that uniquely identifies a specific pair of glasses of a user, (ii) an adhesive backing that is applied to a backside of the micro mini tracker device to adhere the micro mini tracker device to a frame element of the specific pair of glasses of the user, and (iii) an eye wear tracking mobile app that runs on a mobile device of the user. The eye wear tracking mobile app allows the user to provide the UID tag code value to track location of the specific pair of glasses of the user. In this way, the user ends up saving both time and money when glasses go lost or are misplaced.

In some embodiments, the method for tracking and locating missing eye wear includes several steps. The several steps of the method for tracking and locating missing eye wear include (i) attaching, by the user, the micro mini tracker device to the glasses, (ii) downloading, by the user on their computing device (such as a mobile device), an eye wear tracking software application (or mobile app) to use in connection with the micro mini tracker device to track and find the glasses when lost or misplaced, (iii) creating an account, by the user, in the eye wear tracking software application and entering a unique identifier (UID) tag code corresponding to the micro mini tracker device, (iv) using the eye wear tracking software application, by the user, to locate the glasses when the glasses go missing or lost, and (v) displaying the location of the glasses as a map or detailed description of the location to allow the user to locate the lost or misplaced glasses.

Embodiments of the eye wear tracking device, system, and method described in this specification provide a solution by implementation of a software application (such as a mobile app) that will help individuals find there lost or missing eye wear when used in combination with an eye wear tracking device. The eye wear tracking device, system, and method of the present disclosure may be comprised of the following elements.

1. A pair of glasses or eye wear
2. Micro mini tracker device attached or embedded in frame of glasses
3. Application (software application, mobile app, web app, etc.) for tracking the location of the glasses through the micro mini tracker device The micro mini tracker device is disposed along, embedded in, or located on a frame element of a pair of glasses/eye wear item. The micro mini tracker device is registered with a unique identifier (UID) tag (also referred to as a UID tag, a UID tag code, a tracker device code, or a micro mini tracker device code) in an application (#3) and when the application is loaded on a computing device (e.g., a mobile app implementation is loaded on a smartphone), the application is connected and is able to track glasses with the micro mini tracker device and quickly find/locate lost or missing glasses/eye wear.

In some embodiments, a wireless link is established between the micro mini tracker device and a computing device on which the application runs. In some embodiments, the wireless link is established for registration of the UID tag code of the glasses in connection with the application. In some embodiments, the wireless link includes additional wireless data communication capabilities. In some embodiments, the wireless link is supported by one or more cellular modems, satellite technology, and wireless devices that provide wireless communication technology, such as WiFi, cellular, Bluetooth, GPS, etc.

The eye wear tracking device, system, and method of the present disclosure generally works by a user interacting with the application. For example, first the user would need to download and install the application. In some embodiments, the user would also need to create an account when the user is a new user. Next, the user would enter an eight digit code located on micro mini tracker device into the application. In some embodiments, the UID tag of the micro mini tracker device includes an alphanumeric code that is eight characters long. In some embodiments, the UID tag of the micro mini tracker device includes a UID tag code that is longer than eight digit or eight characters. In some embodiments, the UID tag of the micro mini tracker device includes a hash encrypted code of eight or more digits or characters. In some embodiments, the UID tag of the micro mini tracker device includes a special "hidden" code that comes printed on a separate item (such as a paper instruction page) when the user purchases the glasses or eye wear. In some embodiments, the special hidden code is a key value for unlocking the hash encrypted code. In some embodiments, after all steps are completed by the user, the application, web app, or mobile app is ready for the user to interact with and start using.

In some embodiments, the micro mini tracker device will include a pre-fabricated alphanumerical code that is manufactured to be readable from an outer surface of the micro mini tracker device. In some embodiments, the pre-fabricated alphanumerical code is the same as the hash encrypted code. In some embodiments, the pre-fabricated alphanumerical code is a non-encrypted value that represents the unique identification of the device for the glasses or eye wear. In some embodiments, the micro mini tracker device includes an embedded integrated circuit with a global positioning system (GPS) integrated circuit (GPS chip), an antenna, a micro-controller, a power source, a substrate on which the GPS chip, the antenna, and the micro-controller are disposed, and an outer cover (collectively forming the micro mini tracker device). In some embodiments, the antenna is an inductively energized antenna which is activated and powered by induction in relation to a source energy system. In some embodiments, the power source is a tiny battery, such as a lithium-ion ("Li-ion") battery.

In some embodiments, the micro mini tracker device also includes an embedded persistent storage on which a UID tag code data value representing the code for the UID tag is permanently stored. In some embodiments, the UID tag code data value is an encrypted hash of the UID tag code (which is then a key for decoding hash encrypted the UID tag code data value) that is visible to a human user when the micro mini tracker device is disposed along an outer surface of the frame element of the glasses. In some other embodiments, the micro mini tracker device is retrofitted by the user (or an agent of the user) to conventional glasses or eye wear. In such cases of retro-fitting, the user/agent places the micro mini tracker device with an adhesive layer on the frame of the glasses or eye wear. In some embodiments, the user buys a pair of glasses or eye wear at a commercial establishment with the micro mini tracker device embedded into the frame of the eye wear or glasses. In some embodiments in which the UID tag code data value is an encrypted hash of the UID tag code, the key value for decoding hash encrypted the UID tag code data value is a special hidden code that is presented to the user on a physical paper, sticker, or card, or is obtained wirelessly by the device of the user.

In some embodiments, the user (downloads, installs, and starts, if not already done and then) interacts with the application to input user credentials (such as username and password, or a code along with username and password when two-factor authentication is supported and activated by the user) as required, and then enters either the value of the UID tag code (by itself when not hash encrypted), or the value of the UID tag code and the corresponding special hidden code (that is, the key value, when available hash encrypted security when tracking the glasses). The application will then be able to track the glasses and eye wear as registered.

Figure 1:
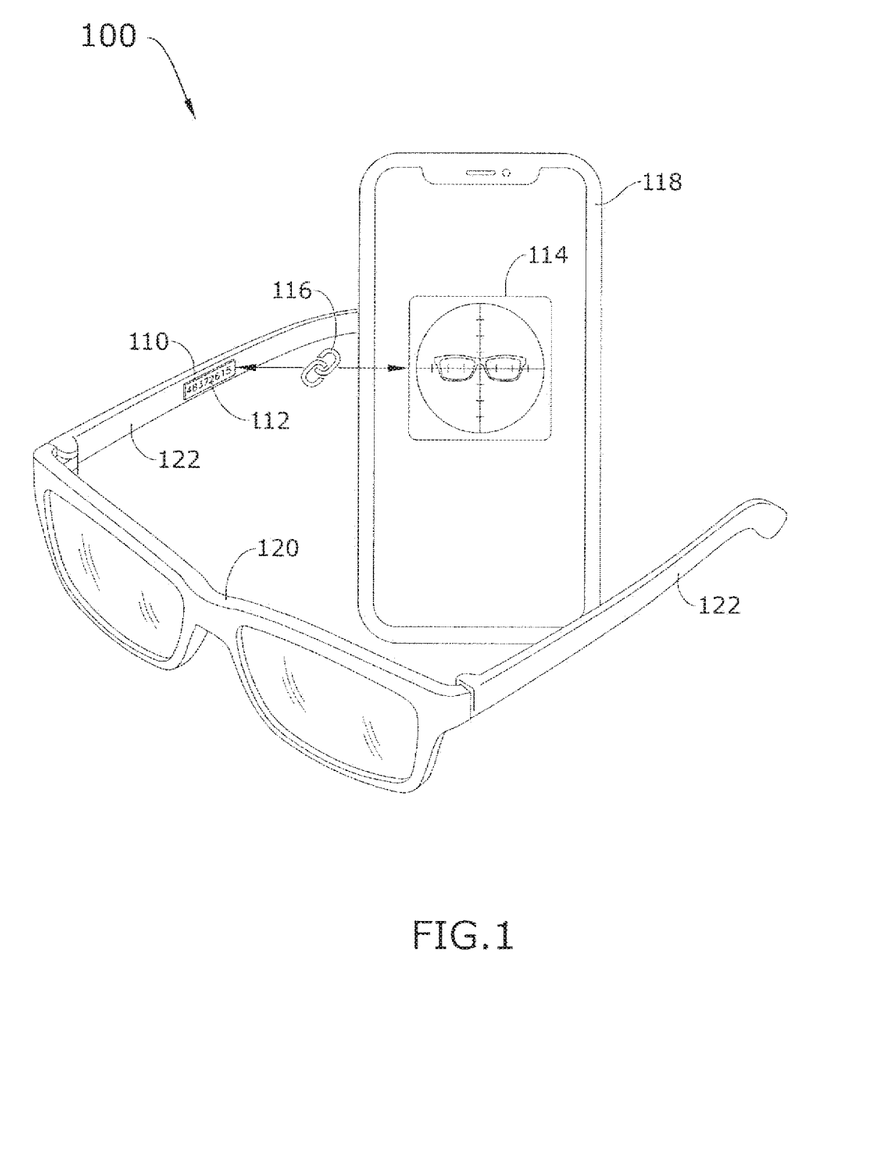
FIG. 1 illustrates an eye wear tracking device and system.

By way of example, FIG. 1 conceptually illustrates an eye wear tracking device and system 100 in some embodiments. As shown in this figure, the eye wear tracking device and system 100 includes a micro mini tracker device 110, a UID tag code 112, and an eye wear tracking mobile app 114 that runs on a mobile device 118 and establishes a wireless link 116 between the micro mini tracker device 110 and the eye wear tracking mobile app 114 running on the mobile device 118. The micro mini tracker device 110 is disposed along a glasses temple frame element 122 of a user's glasses 120. While the micro mini tracker device 110 in some embodiments is embedded within the glasses temple frame element 122 or embedded within another frame element of the user's glasses 120, in this example of FIG. 1, the micro mini tracker device 110 is positioned along an outer surface of the glasses temple frame element 122 of the user's glasses 120, such that the user is able to visually inspect the UID tag code 112 and input the alphanumeric value of the UID tag code 112 to register the micro mini tracker device 110 of the glasses 120 into the eye wear tracking mobile app 114.

In some embodiments, when the micro mini tracker device 110 is embedded within the interior of the glasses temple frame element 122 or another frame element of the user's glasses 120, the user gets the UID tag code 112 in printed or verbal delivery, and then goes on to input the UID tag code 112 to register the micro mini tracker device 110 of the user's glasses 120 into the eye wear tracking mobile app 114 that runs on the mobile device 118.

In some other embodiments, the micro mini tracker device 110 includes a wireless beacon that broadcasts the alphanumeric value of the UID tag code 112 to a receiving device, such as the mobile device 118, which is able to receive the value of the UID tag code 112 via the wireless link 116. In some embodiments, the wireless beacon is a Bluetooth LE beacon device that is connected to a power source, such as a tiny battery, and broadcasts the value of the UID tag code 112 so that other devices can be paired to the Bluetooth LE beacon to receive the UID tag code 112 value as broadcast. Then the user can still obtain the alphanumeric value of the UID tag code 112 wirelessly via the wireless beacon. The user can then enter the wirelessly obtained alphanumeric value of the UID tag code 112 into the eye wear tracking mobile app 114 to register the micro mini tracker device 110 for the user's glasses 120. Alternatively, the eye wear tracking mobile app 114 may automatically scan for the alphanumeric value of the UID tag code 112 and, once found via wireless link, prompt the user to accept or confirm the alphanumeric value—where acceptance or confirmation by the user causes the eye wear tracking mobile app 114 to automatically register the UID tag code 112 of the user's glasses 120.

In some embodiments, the wireless link 116 is a multi-protocol wireless link that includes both the wireless beacon-based link and a broader range wireless communication protocol. In some embodiments, the broader range wireless communication protocol includes one or more of WiFi, GPS, and a cellular wireless protocol, in addition to a narrower wireless technology, such as Bluetooth LE beacon wireless communication with limited range of signal.

To use the eye wear tracking device, system, and method of the present disclosure, a person (or "user") would start by downloading the eye wear tracking application or mobile app and then set up a new account. In some embodiments, after the user has set up an account and logged in, then the user will select an application tool for inputting a new UID tag code that represents the unique identifying value for the micro mini tracker device. For example, the user enters the eight digit code printed on the micro mini tracker device into the application, which is then received by the cloud application service and stored in a cloud database that is communicably connected to a cloud server which hosts the cloud application service. In this way, the cloud application service will have a persistently stored registered value of the eight digital code which relates directly to the same value stored in an embedded storage of the micro mini tracker device. Then, when the user loses their glasses or eye wear, he or she only needs to start the application on their computing device and select a tool to search for and find the missing glasses/eye wear. The application would transmit this search "request" to the cloud application service. The cloud application service would load the persistently stored version of the eight digit code from the cloud database to confirm user identity is paired to the glasses.

In some embodiments, the glasses/eye wear continually receives location data from satellites associated with the embedded GPS chip. Consequentially, the micro mini tracker device continually transmits its location to the cloud application service, which logs all the data and stores securely in the cloud database in connection with the corresponding UID tag code. In this way, when the application connects to the cloud application service and transmits the "request" to search for the missing glasses or eye wear, the cloud application service is able to quickly identify the last location log entry for the glasses, based on the UID tag code and send the location data back to the application running on the user's computing device. The application then displays the location. In some embodiments, the application loads a geographical map of the location to give the user a visual representation of the location. In some embodiments, the application displays both a map and textual data, such as a nearest street address of the location at which the glasses or eye wear are likely to be found.

Figure 2:
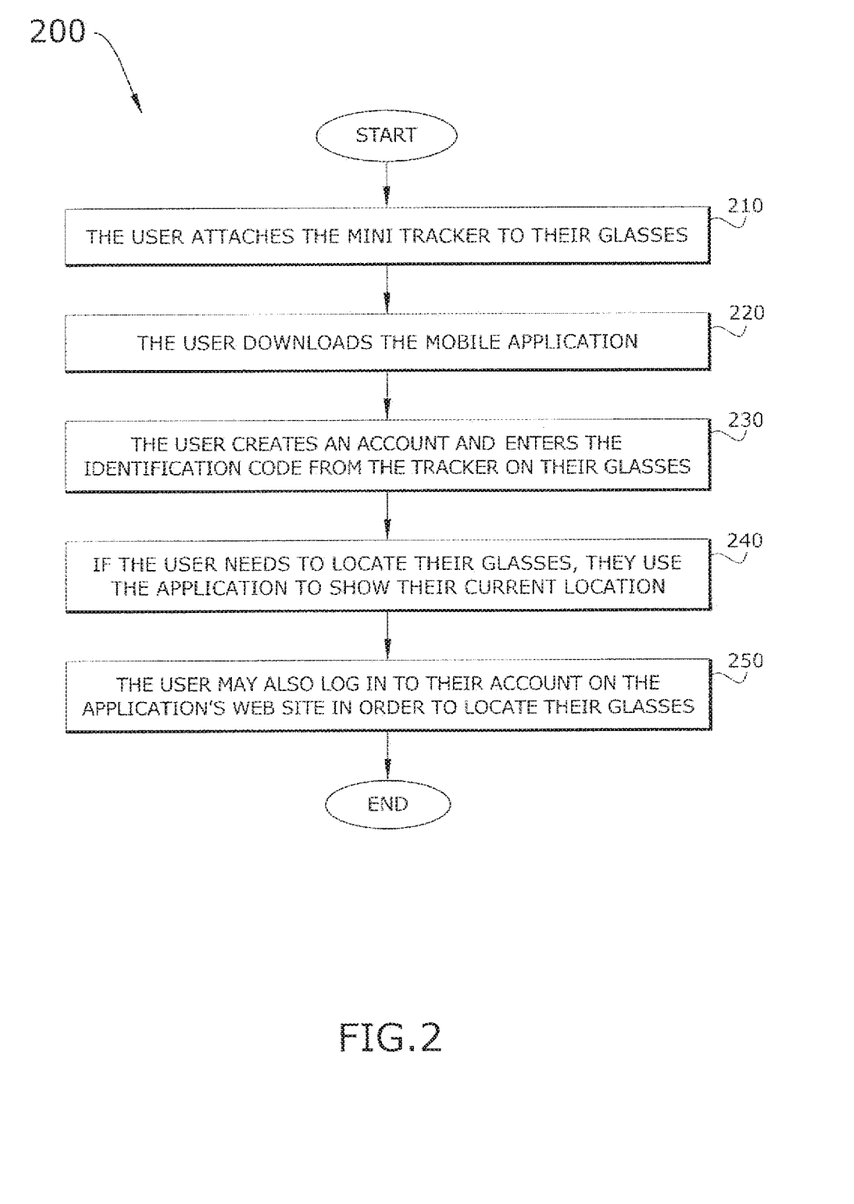
FIG. 2 illustrates a method for tracking and locating missing eye wear.

By way of example, FIG. 2 conceptually illustrates a method for tracking and locating missing eye wear 200. In some scenarios, the user purchases a micro mini tracker device to retro-fit to an existing pair of glasses. However, in some other cases, a user may purchase a pair of new glasses which come with a separate micro mini tracker device for the user to adhere to the frame to track the new pair of glasses. In either of these cases, the method for tracking and locating missing eye wear 200 starts when the user attaches the micro mini tracker device to their glasses (at 210). In the next step, the user downloads and installs the eye wear tracking application or mobile app (at 220). Next, the user creates an account and enters the UID tag code (e.g., eight digit code) of the micro mini tracker device (at 230). The user can enter the UID tag code by either inputting the number as seen at the surface or by wireless link connection to capture the UID tag code value when the micro mini tracker device is embedded and the number is not visible. After the UID tag code is entered, the registered details of the user, the glasses, and the value of the UID tag code are uploaded by the eye wear tracking application or mobile app to a cloud service for permanent secure (encrypted) storage in the cloud database.

In some embodiments, whenever the user needs to locate their glasses, the user simply needs to start the eye wear tracking application or mobile app to track and find their glasses (at 240), which when found, will visually output information about the current location. Such information may include a map of the current location, written text describing the current location, or both. The mechanism by which the eye wear tracking application or mobile app is able to track and find the user's glasses is GPS data, in which the internal GPS device receives location data from satellites in a corresponding GPS system. The micro mini tracker device uses the GPS location data in a control unit (or micro-controller) to calculate current location. The wireless link then transmits (via WiFi, cellular, or other) its current location to the cloud service which logs the current location in conjunction with the UID tag code value stored in the cloud database. In this way, the cloud service always has a most currently known location of the glasses when the user requests the app to find the most current known location of the glasses. The user may also log in to the web app (or web site of the application) in order to find their glasses (at 250). Then the method for tracking and locating missing eye wear 200 ends.

Figure 3:
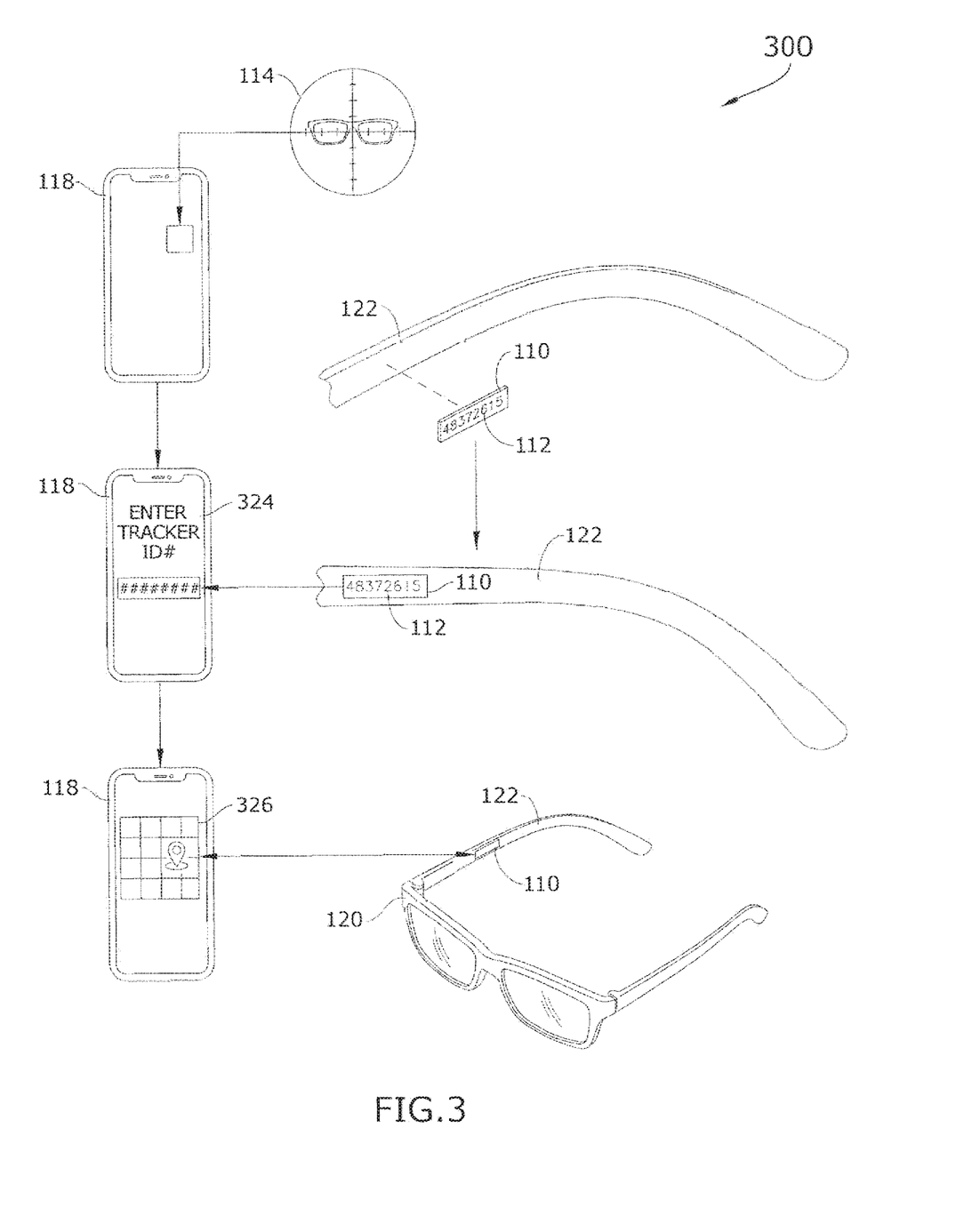
FIG. 3 illustrates a user method for interacting with a mobile application that implements the method for tracking and locating missing eye wear.

Now turning to another example, FIG. 3 conceptually illustrates a user method for interacting with the eye wear tracking mobile app 300. As shown in this figure, the user method for interacting with the eye wear tracking mobile app 300 includes the eye wear tracking mobile app 114 running on the mobile device 118. After the user starts the eye wear tracking mobile app 114 running on the mobile device 118, the user may select an option to register a new UID tag code 112 corresponding to a micro mini tracker device 110 that is disposed along an outer surface of a frame element 122 of the user's glasses 120. Upon this selection by the user, the eye wear tracking mobile app 114 running on the mobile device 118 may visually output a tracker ID prompt 324 on a screen of the mobile device 118. The tracker ID prompt 324 in this example instructs the user to "ENTER TRACKER ID #". However, the tracker ID prompt can vary according to various implementation aspects, and is not limited to the visual appearance as shown in this example. When the tracker ID prompt 324 is visually output onto the screen, the user inputs the value of the UID tag code 112 as shown on the outer surface of the micro mini tracker device 110. In some embodiments, the value of the UID tag code 112 is an eight digit code. In some embodiments, the value of the UID tag code 112 is a longer alphanumeric code. In this example, the value of the UID tag code 112 for the micro mini tracker device 110 is an eight digit numeric code, with value of "48372615". As the user inputs the value of the UID tag code 112, the input field obscures the display of characters input by the user. For instance, the user may type in the actual value of the UID tag code 112 as "48372615" but the eye wear tracking mobile app 114 may receive the numbers and immediately display an obfuscation character, such as "#" or "*", for each number entered by the user, thereby ensuring that the value of the UID tag code 112 is secure. Furthermore, the practice of displaying obfuscation characters in place of user-entered numbers or characters is especially important for ensuring security when the user is entering a key value (special hidden code) which is used to decode a hash encrypted value of the UID tag code 112.

Next, the eye wear tracking mobile app 114 running on the mobile device 118 transmits the value of the UID tag code 112 to the cloud service as a request to locate the user's glasses. As noted above, the eye tracking mobile app 114 also transmits validating authentication information that verifies the identity of the user and other vital information. The cloud service than queries the log of locations stored in the cloud database based on the value of the UID tag code 112 and retrieves the most current known location information for the user's glasses 120. Then the cloud service transmits the most current known location information back to the eye wear tracking mobile app 114. Then the eye wear tracking mobile app 114 loads and displays a map of the location 326 corresponding to the most current known location of the user's glasses.

Figure 4:
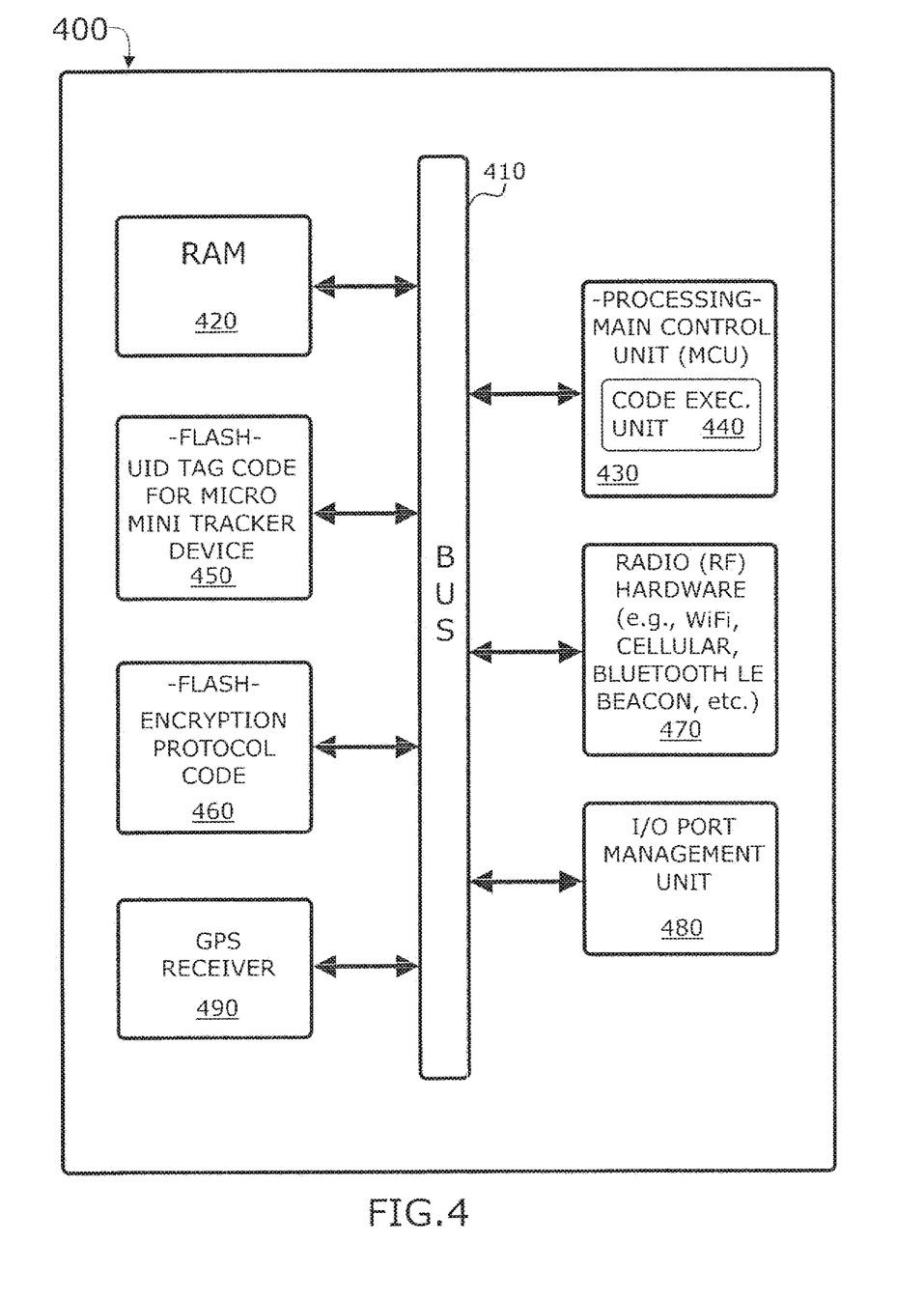
FIG. 4 illustrates a block diagram of micro mini tracker device.

By way of example, FIG. 4 conceptually illustrates a block diagram of micro mini tracker device 400. As shown in this figure, the micro mini tracker device 400 includes a bus 410, a random access memory (RAM) 420, a main control unit (MCU) 430 for runtime processing of the micro mini tracker device, a code execution unit 440 embedded within the MCU 430, a first persistent flash memory 450 that stores the UID tag code for the micro mini tracker device (in encrypted form for security), a second persistent flash memory 460 that stores encryption protocol code that is executed by code execution unit 440 of the MCU 430 to decrypt (or decode) the UID tag code that is stored in the first persistent flash memory 450 when a user obtains the UID tag code value from an embedded micro mini tracker device using a wireless connection (such as Bluetooth) from a device (such as a mobile device), radio (RF) hardware 470 (such as WiFi, cellular, Bluetooth LE beacon, etc.) to establish the wireless link 116 and communicate wirelessly with the cloud service to transmit location information to provide the most current known location of the glasses, an input/output (I/O) management unit 480, and a GPS receiver 490 that continually receives GPS data from satellites and uses the GPS data to calculate the most current known location of the glasses before transmission to the cloud service for storage in the location log stored in the cloud database. While the block diagram of micro mini tracker device 400 shown in FIG. 4 does not illustrate a cover of outer surface housing, a person of ordinary skill in the relevant art would appreciate that such an outer surface housing would encapsulate the above-referenced components within the micro mini tracker device 400, and the outer surface housing could therefore include an embossing or etching that represents the value of the UID tag code.

Figure 5:
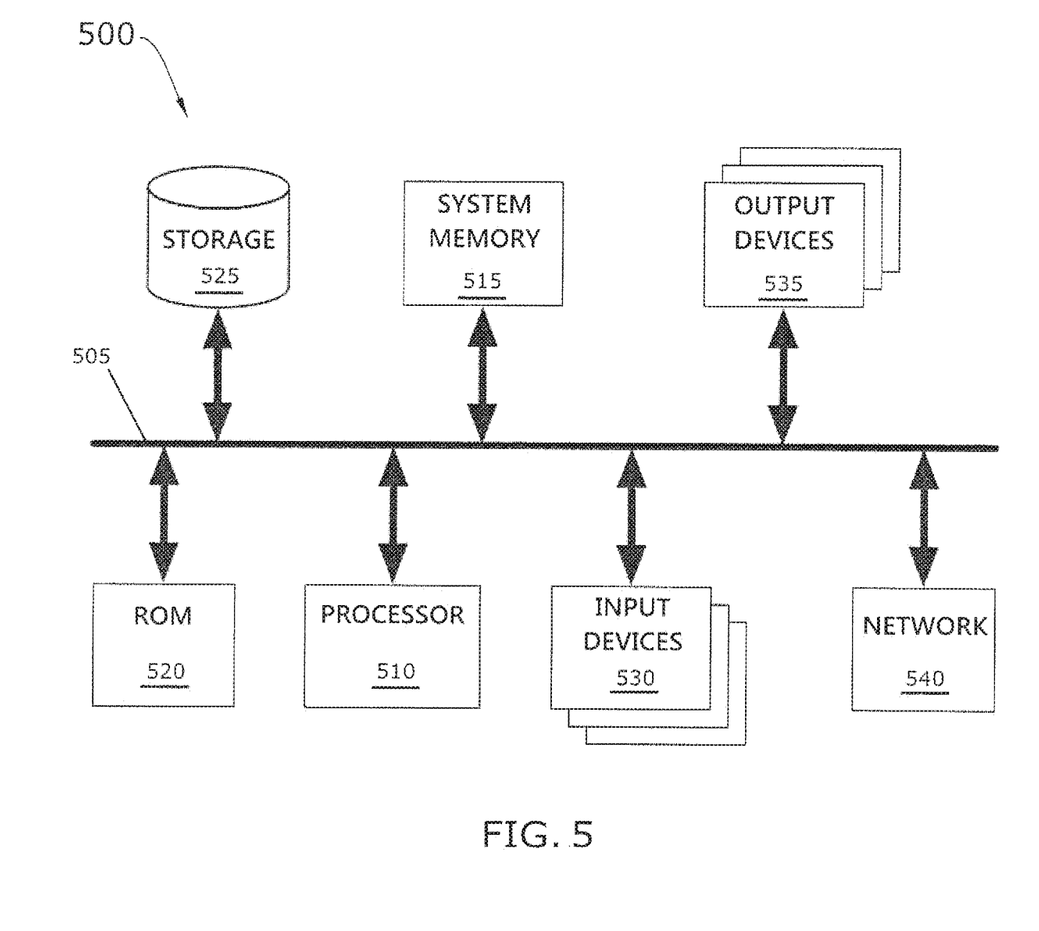
FIG. 5 illustrates an electronic system that implements the method.

In this specification, the term "software" is meant to include firmware residing in read-only memory or applications stored in magnetic storage, which can be read into memory for processing by a processor of an electronic system, such as a mobile device or computer. By way of example, FIG. 5 conceptually illustrates an electronic system 500 with which some embodiments of the invention are implemented. The electronic system 500 may be a computer, phone (cell phone, mobile phone, smartphone, etc.), PDA (iPod, other handheld computing device, etc.), or any other sort of electronic device or computing device. Such an electronic system includes various types of computer readable media and interfaces for various other types of computer readable media. Electronic system 500 includes a bus 505, processing unit(s) 510, a system memory 515, a read-only memory 520, a permanent storage device 525, input devices 530, output devices 535, and a network 540.

While the invention has been described with reference to numerous specific details, one of ordinary skill in the art will recognize that the invention can be embodied in other specific forms without departing from the spirit of the invention.

I claim:

1. An eye wear tracking system comprising:
    a micro mini tracker device comprising (i) a unique identifier (UID) tag code with a UID tag code value that uniquely identifies a specific pair of glasses of a user, (ii) a global positioning system (GPS) receiver that is configured to continually receive location data from a plurality of GPS satellites, and (iii) a first persistent storage that is configured to store a hash encrypted UID tag code that is received when the user provides the UID tag code value as a key to hash encrypt the UID tag code of the micro mini tracker device, wherein the micro mini tracker device calculates a current known location of the specific pair of glasses based on the location data received from the plurality of GPS satellites;
    an adhesive backing that is applied to a backside of the micro mini tracker device to adhere the micro mini tracker device to a frame element of the specific pair of glasses of the user; and
    an eye wear tracking mobile app that runs on a mobile device of the user, wherein the eye wear tracking mobile app allows the user to provide the UID tag code value to track location of the specific pair of glasses of the user.

2. The eye wear tracking system of claim 1, wherein the micro mini tracker device further comprises a third persistent storage that is configured to store the UID tag code value.

3. The eye wear tracking system of claim 1, wherein the micro mini tracker device further comprises a second persistent storage that is configured to store an encryption algorithm that is used to encrypt the UID tag code value as a hash.

4. The eye wear tracking system of claim 3 further comprising an eye wear tracking cloud service and an associated eye wear tracking cloud database.

5. The eye wear tracking system of claim 4, wherein the eye wear tracking mobile app transmits the UID tag code value to the eye wear tracking cloud service when the user provides the UID tag code value to register the micro mini tracker device as corresponding to the specific pair of glasses, wherein the eye wear tracking cloud service stores the hash encrypted UID tag code in the eye wear tracking cloud database upon registration of the micro mini tracker device.

6. The eye wear tracking system of claim 5, wherein the micro mini tracker device continually transmits the current known location of the specific pair of glasses when calculated to the eye wear tracking cloud service, wherein the eye wear tracking cloud service stores the current known location of the specific pair of glasses in the eye wear tracking cloud database.

7. The eye wear tracking system of claim 6, wherein the eye wear tracking mobile app sends a request to track and find the specific pair of glasses to the eye wear tracking cloud service when the user selects an option to locate the specific pair of glasses, wherein the eye wear tracking cloud service retrieves the current known location of the specific pair of glasses from the eye wear tracking cloud database and sends the current known location of the specific pair of glasses back to the mobile device on which the eye wear tracking mobile app is running.

8. The eye wear tracking system of claim 7, wherein the eye wear tracking mobile app loads a map that corresponds to the current known location of the specific pair of glasses when the current known location of the specific pair of glasses is received from the eye wear tracking cloud service, wherein the eye wear tracking mobile app visually outputs the map on a display screen of the mobile device for the user to see.

\* \* \* \* \*